Patented Nov. 4, 1924.

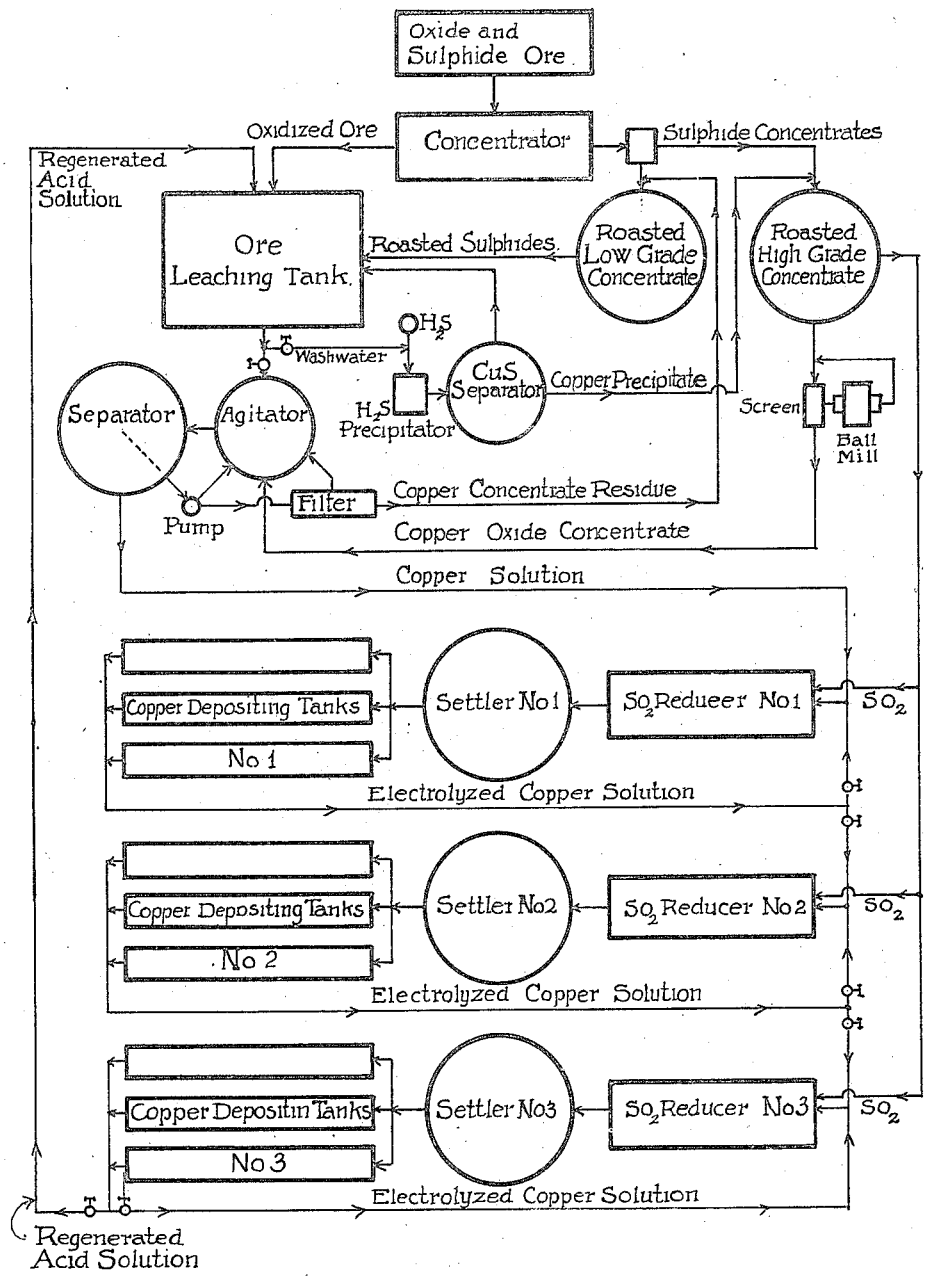

1,514,153

UNITED STATES PATENT OFFICE.

WILLIAM E. GREENAWALT, OF DENVER, COLORADO.

METALLURGICAL PROCESS.

Application filed April 7, 1923. Serial No. 630,635.

*To all whom it may concern:*

Be it known that I, WILLIAM E. GREENAWALT, a citizen of the United States, residing in the city and county of Denver and State of Colorado, have invented certain new and useful Improvements in Metallurgical Processes, of which the following is a specification.

My invention relates, in general, to metallurgical processes, and more particularly to processes applicable to the extraction of copper from its ores by solvent methods. It is more specifically directed to the treatment of copper ores by leaching and electrolysis, and may be considered as an improvement, of the more basic processes described in my Patents No. 1,353,995, September 28, 1920, and No. 1,357,495, November 2, 1920.

In the treatment of copper ores by leaching and electrolysis of the leach solutions, large quantities of the leach solutions are wasted, due to the excessive amount of iron salts which are dissolved from the ore with the copper, and this dissolved iron, if it accumulates in large quantities, injuriously affects the operation. In large working plants as much as 25% of the copper is chemically precipitated from such waste solutions to keep down the total iron in the electrolyte in order to keep the ferric iron at a certain low maximum for effective deposition of the copper. Copper ores invariably contain iron; some of this iron is inevitably dissolved with the copper, and a point is always reached in the cyclic operation of an acid leaching process when the solution becomes so charged with iron and other impurities that its use becomes impractical on account of the diminished activity of the solvent, and on account of the crystallizing out of the iron salts. In present operating plants the difficulty is avoided by regularly withdrawing a portion of the solution, at each cycle, precipitating the copper from this portion with metallic iron, and then wasting the solution. Water in amount equal to the waste solution is added from time to time to the solvent.

It has long been known that copper oxide, or carbonate, will precipitate iron from neutral copper solutions, and processes have been devised to use this reaction to precipitate the iron from the copper solutions, in the treatment of copper ores, but apparently these processes have not achieved the results hoped for, due probably to the methods employed.

In the regular leaching of copper ores by the usual method of advancing the solution progressively through the ore in the leaching tanks, some iron is inevitably precipitated in the ore, as the neutral, or nearly neutral, solution comes in contact with fresh ore, but the amount precipitated is not sufficient to materially affect the general operation of the process.

I have found that by a proper manipulation of materials usually occurring in copper mining centers, the process of leaching and electrolysis can be carried on indefinitely without wasting any leach solution, or but very little of it. It has been observed that it is easier to precipitate a portion of the iron out of a high-iron leach solution than to attempt a complete, or relatively complete, precipitation. In a solution, for example, containing 4.0% total iron, it is quite easy to precipitate out 1.0% of the iron with copper oxide, leaving 3.0% in the solution, while it is quite difficult to precipitate out 3.0% of the iron, leaving 1.0% in the solution.

The present improvement of the processes described in the above mentioned patents is made feasible, because it is not intended to electrolyze solutions free from iron, or even containing relatively small percentages of iron, but rather to keep the iron within a predetermined limit to avoid wasting a portion of the solution due primarily to other causes than the harmful effect of the ferric salts in the electrolyte. A certain amount of iron, say from 1.5% to 3.0% is preferred in the copper solution which is subjected to electrolysis in the processes described, altho it is not intended to limit the present process to the limitation of any previous processes.

It must be evident that a great saving in acid and in precipitant can be effected if the iron salts and other impurities in the leach solution, or electrolyte, can be kept within bounds so that none of it has to be wasted. At least 2.0 lbs. of metallic iron and 1.56 lbs. of acid can be saved, per lb. of copper, over chemical precipitation.

The process can best be described by referring to the accompanying diagrammatic plan, or flow sheet. In the description of the process, oxide and sulphide ores may be assumed in the mining operations. The oxide and sulphide ores may be a mixture, or occurring separately. Most copper mines are capable of producing both oxide and sulphide ores. If only sulphides are produced, the ore is roasted, as a preliminary treatment. Whatever the form of the ore as it comes from the mines, the sulphide is concentrated, or separated, from the oxide, and especially high grade copper concentrate is made for the purpose of this process.

If the ore is a mixed sulphide and oxide, it is concentrated to remove the oxide from the sulphide. The oxide ore goes to the leaching tank where it is leached with an acid solution to extract the copper. The sulphide ore is preferably separated into a high-grade and low-grade copper product. The low grade concentrate is roasted, and charged into the leaching tank, and treated much the same as the oxide ore. The high grade concentrate is roasted to convert the copper into a high grade copper oxide material, and this oxide material is used to precipitate the excess iron from the leach solution. The copper content of this roasted high grade concentrate should be as high as possible, say from 25% to 40% copper. A concentrated copper oxide product acts quicker and more energetically than a low grade product, and cheapens the operation. It is also advisable to apply it in a finely ground condition. It is easier handled and reacts quicker. As a preliminary, the roasted copper concentrate is ground in a ball mill and passed through a screen, say of 100 mesh, which answers the purpose very well. If the high grade roasted concentrate was originally produced by flotation, much of the roasted material will not require any further grinding.

The copper solution, issuing from the leaching tank, and presumably, nearly neutral, is flowed into the agitator, where it is treated with the copper oxide concentrate from the roasting furnace. The copper solution is quickly neutralized and much of the iron precipitated as the insoluble oxide, while a corresponding amount of copper goes into solution. The solution is preferably heated, since the reacting is more positive in a hot or warm solution than in a cold solution. The agitation should be done with air, since oxygen is required to convert the ferrous iron into the ferric condition, and the ferric condition is necessary for the reaction with the copper. It has been found by careful experimentation that the application of the air by the apparatus described in my Patent No. 1,347,500, April 12, 1921, and 1,374,446, April 12, 1921, is highly effective in oxidizing the ferrous iron to the ferric condition. It is from four to five times as rapid as when the air is applied by other well known means, such, for example, as in the ordinary Pachuca tanks.

In this way the iron may be kept at any desired limit. It is not necessary in the operation of the process that all the iron should be eliminated before electrolysis. It will ordinarily be desirable to maintain the iron in the solution at a fairly high standard, because, with effective reduction with sulphur dioxide, as indicated and as the process is assumed to operate, a better electrolytic efficiency can be obtained in the deposition of the copper and durability of the anodes, than is obtainable with copper solution free from iron salts. Then, too, it is easy to precipitate a portion of the iron as indicated, than to precipitate the remaining portion completely. The process indicated can be carried out quickly, easily, and economically, while a complete precipitation of the iron would be difficult, expensive, and quite unprofitable.

Suppose it is intended to maintain the electrolyte at about 2.5% iron. When the electrolyzed solution is returned to the ore, in the regular cyclic operation of the process, it may issue from the leaching tanks containing, say, 3.5% iron. When this solution is treated with the oxide concentrate as described, the additional 1.0% iron dissolved in the leaching tanks, is quickly precipitated as the insoluble ferric oxide, while an equivalent of copper goes into solution. Other impurities are largely precipitated with the iron. It must be evident that under these conditions no solution need be wasted, or in any case, very small amounts.

The copper solution, issuing from the copper oxide treatment, flows into the $SO_2$ reducer No. 1, where it is treated with sulphur dioxide from the roasting furnace, and where the ferric salts formed by the electrolysis are reduced to the ferrous condition. Acid is regenerated both in the deposition of the copper and in the reduction of the ferric salts. The neutral solution from the leaching tanks therefore mixes with the acid electrolyte in the reducer before it passes to the copper depositing tanks. Under the conditions, the ferric salts are quickly and completely reduced with the sulphur dioxide, and as a result the ampere efficiency in the deposition of the copper quite closely approaches the theoretical. The electrolyte is circulated in a closed circuit between the reducer No. 1, settling No. 1, and the copper depositing tanks No. 1, so that the ferric iron will not exceed a predetermined limit, on issuing from the copper depositing tanks, or say, about 0.25%. At the same time, a portion, representing the advance flow, is diverted to reducer No. 2, where it is treated with sulphur gas from the roasting furnace, and from the reducer, it flows into settler No. 2, and from the settler, into the copper depositing tanks No. 2, and again flows in a closed circuit between the reducer, the settler, and the copper depositing tanks, until the copper is reduced to the desired amount, while, again, a portion of the solution, the advance flow, is delivered to the reducer No. 3, then to settler No. 3, then to the copper depositing tanks No. 3, and circulated until the desired amount of copper is deposited, when the solution, the advance flow, is returned to the ore, or copper leaching tanks, to pass through another complete cycle. Under these conditions, it has been found that about 3.0 lbs. of acid is regenerated, per 1.0 lbs. of copper deposited. The progress of the copper solution through the electrolytic department may be illustrated as follows: If the solution is neutral and contains, say 3.5% copper, the copper in the first electrolytic unit, consisting of reducer, settler, and corresponding copper depositing tanks, is reduced from 3.5% to 2.5% with the simultaneous regeneration of about 3.0% acid. In the second electrolytic unit the copper may be reduced from 2.5% to 1.75%, and the solution will show about 5.25% acid. Similarly, in the third electrolytic unit, the copper is reduced from 1.75% to 1.0%, and the solution going back to the ore will contain about 7.5% acid. Much of the excess acid is consumed in the ore in acting on the iron, alumina, and lime. Most of the acid is consumed in acting on the line to form calcium sulphate, which is insoluble and remains in the ore. In the ordinary leaching of oxidized copper ores it will take from 3 to 5 lbs. of acid to dissolve 1.0 lb. of copper. If the acid is insufficient, it can be greatly increased at very little expense by roasting the concentrate so that most of the copper will be in the form of sulphate. This sulphate is soluble in water, and when treated with sulphur dioxide and electrolyzed in the regular operation of the process, will render 3.0 lbs of acid per lb. of copper deposited, the same as the copper leached from the oxidized ore.

The copper oxide concentrate, as applied to the leach solution, will ultimately become impoverished in copper and fouled with precipitated iron and other impurities. Some of the iron may be in the form of basic salts, and as such, would be soluble in an acid solution if it were attempted to dissolve the copper from the copper oxide concentrate residue. If this residue is roasted, there is no difficulty in extracting the copper. A high percentage of the copper can be made water soluble, while practically all the iron and other impurities can be made insoluble in a dilute acid solution. It is therefore roasted, and again applied to the copper solution, or electrolyte, as before described. If the mine ore contains considerable sulphide, so that most, or all of the ore has to be roasted, the concentrate residue is roasted with the low grade concentrate and no further special attention need be paid to it. It will be leached in the regular operation of the process of the low grade roasted material.

All leaching operations have an excess of wash water, which must be kept separate from the regular leach solution, and the copper from such wash water must be separately precipitated. In the present process this done by means of hydrogen sulphide, and the resulting copper sulphide precipitate is mixed with the high grade concentrate and roasted with it. In this way the copper from the wash waters is easily taken care of and converted into the electrolytic metal, while performing the important function of precipitating a portion of the excess iron. If the amount of sulphide precipitate is large and the ore is an oxide with no sulphide, the sulphide precipitate may be roasted by itself and the roasted product applied to the copper solution as explained for the high grade copper oxide concentrate. If iron is used as the precipitant, the cement copper may be roasted the same as the sulphide, and the resulting oxide will answer the purpose just as well. It will be understood that carbonate of copper may be considered the same as the oxide.

It will be observed that in treating the nearly neutral solution from the leaching tank with copper oxide and then withdrawing the neutral solution from the treatment tank, there is practically no opportunity for the iron and other precipitated impurities to be re-dissolved, as in the case of progressive leaching, where the strong and fresh acid solution is brought in contact with the partly treated ore. To avoid re-dissolving the iron, the copper oxide residue containing the precipitated impurities is roasted before leaching. This practically makes all the precipitated impurities insoluble in the ordinary acid leach solutions. The material is preferably mixed with the low grade ore, both for the purpose of roasting and leaching.

Advantage may be taken of this process to build up valuable impurities, such as zinc, nickel, and cobalt, in the solution, for their subsequent recovery when their amounts in the ore are relatively small. If the ore contains copper and either zinc, nickel, or cobalt, each cycle of leaching brings out additional amounts of the metals. The copper is removed from the solution by electrolysis in the regular cyclic operation of the process, while any of the other metals accumulate. When they have accumulated sufficiently to make their recovery worth while, the remaining copper in the solution, after the electrolysis, is precipitated chemically, preferably with hydrogen sulphide, and the other desired metals, such as zinc, nickel, and cobalt, are then recovered from the solutions enriched in these metals and freed from copper. If the iron accumulates faster in the leach solution than is desired for the other metals to get a suitably enriched solution, some of the iron may be precipitated from time to time from the leach solution with copper oxide, preferably the concentrated and finely divided oxide obtained from roasting the precipitate obtained by precipitating copper from wash water or from waste foul solutions with either hydrogen sulphide or metallic iron.

In the electrolysis of an acid leach solution containing copper, iron, zinc, nickel, cobalt, etc., the copper is deposited with the simultaneous regeneration of acid and ferric iron, while the other metals remain unaffected and increase with each cycle of leaching and electrolysis, and when the solution is sufficiently enriched in the metal or metals desired, a portion of the solution is withdrawn from the regular leaching circuit, and the desired metals recovered therefrom. The method of recovering these metals is immaterial to the present process.

I claim:

1. A metallurgical process comprising, treating oxidized ores of copper with an acid solution to extract the copper whereby iron is brought into solution as an impurity, separating the resulting copper solution from the ore, electrolyzing the copper solution to deposit the copper and regenerate acid, returning the regenerated acid solution to the ore and repeating the cycle until the solution becomes undesirably charged with salts of iron, then applying a concentrated copper oxide to the solution and agitating the mixture in the presence of air until sufficient iron is precipitated out of the solution to maintain the solution at a predetermined limit of iron, electrolyzing the solution to deposit the copper and regenerate acid, and returning the regenerated acid solution to the oxidized ore.

2. A metallurgical process comprising, treating oxidized ores of copper with an acid solution to extract the copper whereby iron is brought into solution as an impurity, separating the resulting copper solution from the ore, electrolyzing the copper solution to deposit the copper and regenerate acid, returning the regenerated acid solution to the ore and repeating the cycle until the solution becomes undesirably charged with salts of iron, then applying concentrated copper oxide to the solution and agitating the mixture in the presence of air until a portion of the iron is precipitated, then electrolyzing the solution still containing a portion of the iron in solution to deposit the copper and regenerate acid and ferric iron, and reducing the ferric iron produced by the electrolysis by means of sulphur dioxide, and then when the solution is sufficiently depleted in copper and regenerated in acid returning the regenerated acid solution to the ore to pass through another cycle.

3. A process comprising leaching copper ore with an acid solution to extract the copper, then applying a concentrated oxidized copper material to the resulting leach solution to precipitate a portion of the iron from the copper solution, electrolyzing the resulting solution to deposit the copper and regenerate acid and ferric iron, maintaining the ferric iron in the electrolyte at a predetermined limit by alternately subjecting the solution to electrolysis and sulphur dioxide reduction, and then when the solution is sufficiently depleted in copper and regenerated in acid returning the solution to the ore to pass through another cycle.

4. A process comprising treating ores of copper to obtain a concentrate high in copper, roasting the concentrate to convert the sulphide into the oxide, leaching relatively low grade ores of copper with an acid solution to extract the copper, separating the resulting copper solution containing salts of iron from the ore, then treating the solution with the roasted copper concentrate to precipitate a portion of the iron from the copper solution, electrolyzing the solution to deposit the copper and regenerate acid and ferric salts, applying sulphur dioxide to the electrolyte to reduce the ferric salts to the ferrous condition and repeating the cycle of electrolysis and reduction until the copper in the solution is sufficiently depleted and then returning the regenerated acid solution to the ore.

5. A process comprising treating ores of copper with an acid solution to extract the copper, separating the resulting copper solution containing salts of iron from the residue, washing the residue, chemically precipitating the copper from the washwater, roasting the copper precipitate to convert it into the oxide, then applying the resulting concentrated copper oxide to the copper leach solution to precipitate a portion of the iron, electrolyzing the resulting copper solution to deposit the copper and regenerate acid, and returning the regenerated acid solution to the ore.

6. A process comprising treating copper ores with an acid solution to extract the copper, separating the resulting copper solution containing salts of iron from the residue, washing the residue, chemically precipitating the copper from the washwater, roasting the copper precipitate to convert it into the oxide, then applying the resulting concentrated copper oxide to the copper leach solution to precipitate a portion of the iron, electrolyzing the resulting solution to deposit the copper and regenerate acid, returning the regenerated acid solution to the ore and repeating the cycle, and when the copper oxide concentrate becomes sufficiently impoverished in copper and polluted with precipitated impurities roasting the residual copper oxide and impurities and leaching the roasted material to recover the copper therefrom.

7. A process comprising treating ores of copper with an acid solution to extract the copper, separating the resulting copper solution containing salts of iron from the ore, treating the copper solution so obtained with a material containing a large percentage of oxidized copper to precipitate a portion of the iron from the solution, electrolyzing the resulting copper solution to deposit the copper and regenerate acid, returning the regenerated acid solution to the ore and repeating the cycle, and when the copper oxide concentrate becomes impoverished in copper and polluted with precipitated impurities roasting the residual copper oxide and impurities and leaching the roasted material to recover the copper therefrom.

8. A process comprising leaching ores of copper with an acid solution, washing the residue, precipitating the copper from the washwater with a chemical precipitant, roasting the precipitate, applying the roasted precepitate to the leach copper solution, and then electrolyzing the leach copper solution.

9. A process of treating copper ores containing sulphides comprising, treating the ore to separate the sulphide mineral into a concentrate relatively low in copper and into a concentrate relatively high in copper, separately roasting the low-grade and the high-grade concentrate, leaching the roasted low grade concentrate with an acid solution to extract the copper, separating the resulting copper solution containing salts of iron from the residue, then treating the resulting copper solution with the roasted high-grade concentrate to precipitate a portion of the iron from the copper solution, and then electrolyzing the solution.

10. A process of treating copper ores containing sulphides comprising, concentrating the ore to yield a product relatively low in copper and product relatively high in copper, separately roasting the low-grade and the high-grade concentrate, leaching the low-grade concentrate with an acid solution to extract the copper, separating the resulting copper solution containing salts of iron from the residue, then treating the resulting copper solution with the roasted high-grade concentrate to precipitate a portion of the iron from the copper solution, electrolyzing the copper solution to deposit the copper and regenerate acid, returning the regenerated acid solution to the ore, and repeating the cycle, and when the roasted high-grade copper concentrate becomes impoverished in copper and fouled with precipitated impurities transferring the residue and impurities to raw low-grade concentrate and roasting and leaching the mixture.

11. A process of treating mixed copper ores comprising, separating the ore into a relatively high-grade sulphide concentrate and a relatively low-grade oxidized tailing, leaching the low grade material with an acid solution to extract the copper, separating the copper solution containing salts of iron from the residue, roasting the high-grade copper concentrate and applying the resulting concentrated copper oxide to the copper solution, then electrolyzing the copper solution to deposit the copper and regenerate acid, and returning the regenerated acid solution to the low-grade oxidized material to pass through another cycle.

12. A process of treating copper ores comprising, leaching the ore with an acid solution to extract the copper, separating the nearly neutral copper solution containing salts of iron from the ore, applying concentrated copper oxide to the solution to precipitate a portion of the iron, then electrolyzing the solution to deposit the copper and regenerate acid, and returning the regenerated acid solution to the ore.

13. A process comprising treating ores of copper with an acid solution to extract the copper, separating the resulting low-acid copper solution containing salts of iron from the ore, applying concentrated copper oxide to the copper solution to precipitate a portion of the iron, then electrolyzing the solution to deposit the copper and regenerated acid and returning the regenerated acid solution to the ore, and when the concentrated copper oxide material becomes impoverished in copper and fouled with precipitated impurities roasting the material and leaching the roasted material to recover the copper therefrom.

14. A process comprising treating copper ores with an acid solution to extract the copper, separating the resulting solution containing salts of iron from the ore, then treating the nearly neutral solution with a concentrated copper oxide material to precipitate a portion of the iron from the copper solution, then applying the neutral solution to a partly electrolyzed solution comprising another step in the cyclic process to maintain the electrolyte slightly acid, then electrolyzing the solution to deposit the copper and regenerate acid, and returning the regenerated acid solution to the ore.

15. A process comprising treating copper ore with an acid solution to extract the copper, separating the resulting copper solution containing salts of iron from the ore, precipitating copper from copper solutions with a chemical precipitant, separating the resulting copper precipitate from the denuded solution, roasting the copper precipitate to convert it into the oxide, applying the resulting concentrated copper oxide to the leach copper solution, electrolyzing the copper solution to deposit the copper and regenerate acid and ferric iron, and returning the electrolyzed solution to the ore.

16. A metallurgical process comprising treating copper ore containing other metals with an acid solution to extract copper and other metals, separating the resulting copper solution containing salts of iron from the ore, electrolyzing the solution to deposit the copper and regenerate acid and ferric iron, returning the regenerated acid solution to the ore and repeating the cycle until the solution becomes undesirably charged with iron, precipitating copper from its solutions with a chemical precipitant, roasting the resulting copper precipitate to convert it into the oxide, applying the resulting copper oxide to the leach copper solution and electrolyte to precipitate a portion of the iron, and repeating the cycle until the leach copper solution becomes charged with other metals such as zinc, nickel and cobalt, then chemically precipitating the remaining copper from the solution, and recovering the other desired metals from the resulting solution freed from copper.

17. A metallurgical process comprising treating copper ore containing other metals such as zinc, nickel, and cobalt, with an acid solution to extract copper and other metals, separating the resulting copper solution containing salts of iron and of the other metals from the ore, electrolyzing the solution to deposit the copper and regenerate acid and ferric iron, returning the regenerated acid solution to the ore and repeating the cycle until the solution becomes undesirably charged with iron, applying concentrated copper oxide to the leach copper solution to precipitate a portion of the iron and repeating the cycle until the leach copper solution becomes sufficiently charged with the other metals to make their recovery desirable, then withdrawing a portion of the solution of the leaching and electrolytic circuit and recovering the desired metals therefrom.

WILLIAM E. GREENAWALT.